INVENTORS
BERNARD H. SOFFER
THEODORE H. MAIMAN

BY

Elliott & Pastoriza
ATTORNEYS

United States Patent Office 3,524,147
Patented Aug. 11, 1970

3,524,147
METHOD AND APPARATUS FOR THE ELECTRO-OPTIC CONTROL AND MODULATION OF LIGHT
Bernard H. Soffer and Theodore H. Maiman, Pacific Palisades, Calif., assignors to Union Carbide Corporation, a corporation of New York
Filed Mar. 29, 1967, Ser. No. 626,731
Int. Cl. G02f 1/28
U.S. Cl. 332—7.51                                6 Claims

ABSTRACT OF THE DISCLOSURE

A system is provided for the control and modulation of light by utilizing a controlled electric field passed through a frequency doubling crystal of lithium niobate. The controlled light is in the form of the output of doubled frequency radiation derived from laser radiation of the fundamental frequency passed into the crystal. The electric field is directed at right angles to the radiation path through the crystal and by careful control of the field strength, the difference in the indices of refraction for the ordinary fundamental and extraordinary second harmonic propagations in the crystal can be equalized such that the output of doubled frequency radiation is maximized. Modulation of the electric field affects the crystal material such as to vary these indices of refraction resulting in a change in the amplitude of the output of the doubled frequency radiation.

Figure 1:
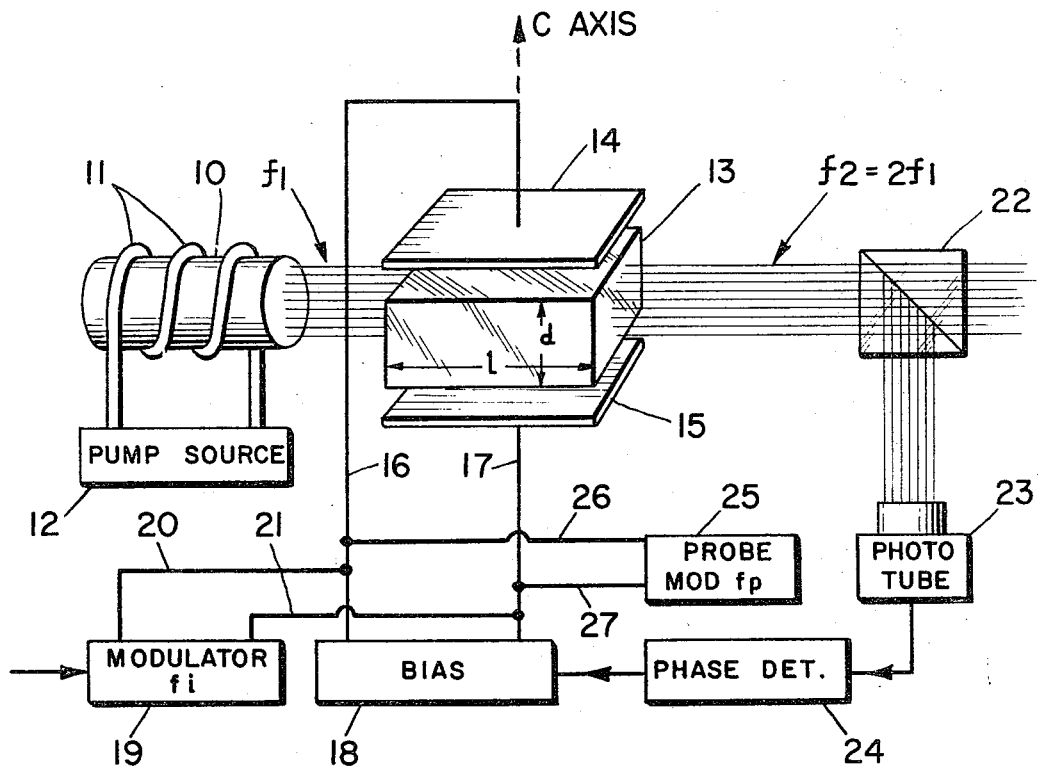

The apparatus includes a biasing electric field which may be automatically adjusted by a feedback means to maintain the electric field at a value at which the doubled frequency output radiation is maintained at its maximum value or at a pre-selected value. Automatic correction for temperature effects on the crystal can thus be provided by the electric field. Further, the field may be modulated by information signals to modulate the output about its maximum or selected output value.

---

This invention relates to a method and apparatus for electro-optically controlling and modulating light in the form of coherent radiation derived from laser radiation passed into a doubling crystal.

It is possible to modulate the output of doubled frequency radiation from a doubling crystal derived from a fundamental frequency radiation passed into the crystal from a laser device. This modulation can be effected by applying an electric field through the doubling crystal normal to the path of radiation through the crystal. The presence of this field, together with other parameters, exerts an influence on the indices of refraction of the ordinary fundamental propagation and the extraordinary second harmonic propagation present in the crystal. When these respective indices are equal, the amplitude of the output of the second harmonic radiation from the doubling crystal is maximum.

Of the other parameters affecting the indices and therefore the output, the most important are the proper physical alignment of the doubling crystal with the incoming laser radiation and the maintaining of the temperature of the crystal at a critical value. A slight change in either of these parameters can reduce to a considerable extent the output of the doubled frequency radiation.

Maintaining the crystal at a critical temperature requires relatively expensive and bulky control equipment. Even with such systems, slight "drifting" of the output radiation from its optimum condition can occur as a result of imperfect temperature control or variations in secondary parameters affecting the optical characteristics of the crystal. Such changes in the amplitude of the output of double frequency radiation from a preselected condition or simply from its maximum output will result in a corresponding change in a desired modution condition realizable for a given modulation signal.

With the above in mind, it is a primary object of the present invention to provide an improved method and apparatus for the electro-optic control and modulation of light employing the techniques of electric field application to a doubling crystal but wherein the foregoing problems are overcome.

More particularly, it is an object to provide a light control and modulation system wherein automatic compensation for temperature changes and changes in other parameters affecting the efficiency of the system is provided to the end that the heretofore required expensive temperature control equipment and the like is no longer necessary.

Another important object of this invention is to provide a light control and modulation method and apparatus wherein a desired selected point on the output of the doubled frequency radiation characteristic curve may be selected and automatically maintained to the end that a predetermined percent of modulation about such point will remain consistent with the input modulating signal.

Briefly, these and many other objects and advantages of this invention are attained by passing a biasing electric field through a frequency doubling crystal receiving laser radiation of the fundamental frequency. This biasing field can be properly adjusted such that the output of the doubled frequency or second harmonic radiation is maintained at an amplitude of given value. An information modulating signal may then be superimposed on the biasing electric field to effect modulation of the output about this selected amplitude.

In accord with a further feature of the invention, means are provided for monitoring at least a portion of the output radiation and generating a feedback signal to control the biasing electric field in a manner to compensate for "drifts" of the output radiation from its pre-selected amplitude. Towards this latter end, there is provided a low frequency probe signal superimposed on the biasing field to provide in the output beam a detectable variation for generating the feedback signal. The feedback signal is of a polarity and amplitude indicative of the degree and direction of any shifting of the output from its selected value so that the electric field bias can be changed accordingly and the output returned to its selected point of operation.

By employing the above-noted feedback system, the optical efficiency of the crystal can be maintained since the feedback will correct for variations in the output resulting from temperature changes. As a consequence, sophisticated equipment is not required to maintain the temperature at a critical value. In addition, by using lithium niobate as the doubling crystal, only a modest electric field strength to effect the desired control and/or modulation of the doubled frequency output radiation is required.

Figure 2:
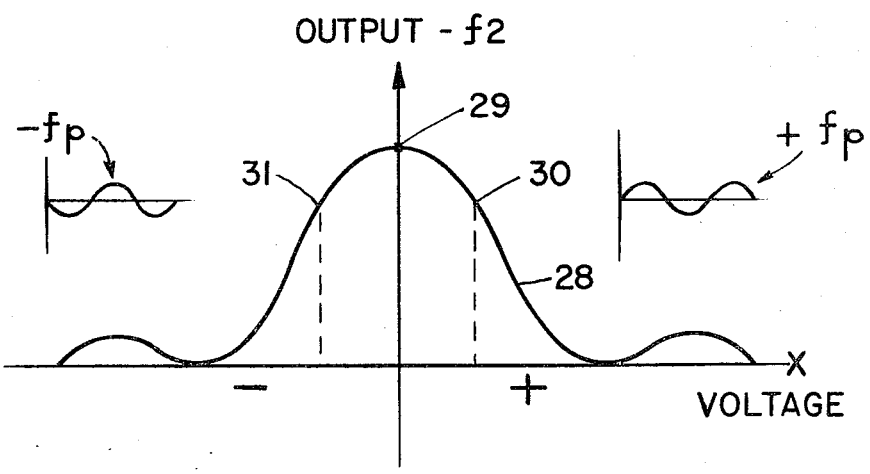

A better understanding of the invention will be had by now referring to the accompanying drawings, in which:

FIG. 1 is a schematic diagram partly in block form illustrating the method and apparatus of this invention; and, FIG. 2 is a characteristic curve of the output amplitude of doubled frequency light radiation as a function of the electric field strength provided by the apparatus of FIG. 1.

Referring to FIG. 1, there is shown a laser rod 10 surrounded by a helical flash lamp 11 powered from a pump source 12. By way of example, the laser rod 10 may constitute a neodymium doped laser ($Nd^{+3}$:YAG) operating to provide a continuous wave radiation of 1.06 microns wave length defining a fundamental frequency $f1$. Positioned to receive the fundamental radiation is a doubling crystal 13 of lithium niobate ($LiNbO_3$). In an actual experimental setup, the crystal was in the form of a rectangular parallelepiped having a length $l$ equal to .810 centimeter along the propagation direction and a width $d$ of .475 centimeter along the C axis which, as indicated in FIG. 1, is normal to the path of propagation through the crystal.

An electric field is applied to the crystal 13 along the C axis by means of plates 14 and 15 connected through leads 16 and 17 to a bias source of voltage 18. A modulating information signal $fi$ may be applied to the same plates from a source 19 by leads 20 and 21 to superimpose this signal on the biasing field.

With the foregoing arrangement as described thus far, efficient and sensitive adjustment to maximum value of the output second harmonic from the doubling crystal can be realized. This adjustment is achieved by application of the biasing field by the plates 14 and 15 which enables a phase matching condition between the fundamental and harmonic propagations in the crystal to be realized. In other words, the index of refraction of the ordinary fundamental wave is made to equal the index of refraction of the extraordinary second harmonic wave by means of the electro-optic effect of the biasing electric field. This phase matching or necessary condition for optimum output of doubled frequency radiation from the crystal can also be realized by carefully adjusting the temperature of the crystal and/or the propagation direction or proper alignment of the crystal. However, as stated heretofore, expensive and bulky external equipment is required to maintain the necessary critical temperature. The ability to control the second harmonic radiation by the electro-optic effect, which avoids the necessity of critical temperature control thus constitutes an important feature of this invention.

With the biasing electric field supplied from the biased source 18 adjusted to a value such that proper phase matching is assured, the output of doubled frequency radiation $f2$ from the crystal 13 can now be modulated in amplitude by superimposing the desired modulating information signal on the plates from the modulator 19. Suitable adjustments in the bias field can be made to select a desired point on the output characteristic curve for the second harmonic radiation, about which information modulation is to take place. The properties of the lithium niobate crystal are well suited to this particular operation, the crystal, belonging to the point group $3m$, remaining unaxial when the electric biasing field is applied along its optic or C axis. The crystal is operated in the neighborhood of the phase matching condition without double refraction.

The particular apparatus of FIG. 1 also includes a second important feature of this invention in the form of a feedback control for automatically adjusting the biasing electric field in such a manner as to compensate for changes in the output of doubled frequency radiation as a consequence of slight temperature changes or changes in other parameters affecting the indices of refraction for the ordinary fundamental and extraordinary second harmonic propagation within the crystal.

This feedback control means includes a beam splitter 22 for directing a portion of the output radiation into a photo tube 23. The output of the photo tube 23 passes through a phase detector 24 to provide a feedback signal to the bias source 18. This feedback signal is derived by superimposing on the electric field plates 14 and 15 a low frequency probe modulating signal $fp$ such as by a modulator 25 through the leads 26 and 27. The amplitude and polarity of the feedback signal derived from this probe signal and detected in the photo tube 23 and phase detector 24 will depend upon the amplitude and direction of any change in the amplitude of the output of doubled frequency radiation from its predetermined selected operating point on the output characteristic curve. The biasing field is thus changed in a proper direction to compensate for such change of the amplitude of the output radiation which shifting may be caused by temperature or other parameters. As a result, the feedback arrangement provides an automatic control of the second harmonic light radiation from the crystal and will thus assure that a selected point about which information signal modulation is to take place on the characteristic curve is maintained. The probe signal will generally be of a lower frequency than any information modulating signal and operates independently of the information modulation signal which latter signal is filtered from the feedback signal.

A better understanding of the foregoing as well as the entire operation of the invention will be had by referring to FIG. 2 wherein the amplitude of the doubled frequency output from the crystal 13 is plotted as a function of the electric field passed through the doubling crystal. The curve is shown at 28 and is symmetrical about the vertical axis. The maximum output is indicated at 29 and this condition can occur when the electric field is zero, as shown, or some other selected value, assuming that the condition has previously been established by proper selection of the temperature and other parameters affecting the output.

The output as measured along the vertical axis is defined by the function $\sin^2 X/X^2$ where X represents abscissa values. The parameter X, as indicated in FIG. 2, may constitute a measure of the voltage and thus the electric field strength. However, the same curve would result where X is a measure of the temperature or a measure of the difference between the indices of refraction of the ordinary fundamental wave propagated in the crystal and the extraordinary second harmonic wave propagated in the crystal. When these two indices of refraction are equal; that is, when X equals zero, then the output of the doubled frequency radiation will be maximum. It will be clear accordingly, that changes in the values of these indices of refraction which changes occur as a result of temperature changes or changes in the electric field, affect the amplitude of the output radiation in the manner described by the curve 28.

In FIG. 2, two points of inflection 30 and 31 are indicated on the curve 28. At these points, there occurs the maximum rate of change of the output for a given incremental change in the applied field. Therefore, a desirable modulation condition of the output occurs when the modulation takes place about these points. At the maximum output point 29 wherein maximum amplitude of the second harmonic radiation is provided, a fairly large change in the modulating signal applied to the electric field plates is required to effect changes in the amplitude of the output radiation. For information signal modulation, it is therefore preferable to operate at or close to one of the inflection points.

Considering first the operation of the device merely to provide a controlled output light radiation of maximum output at the desired double frequency, the biasing field would be close to zero and would actually be set at zero if it could be assured that the crystal was maintained at the critical temperature for which phase matching of the fundamental and harmonic waves occurs. If, however, the temperature deviates from this critical value, it is a simple matter, in accord with the invention, to vary the bias electric field in such a manner as to effect the desired phase matching condition or condition in which the heretofore referred to indices of refraction are equal. In other words, if a temperature deviation from the critical temperature occurred, the characteristic operating point on the curve 28 in FIG. 2 would effectively move along the curve to the left or right of the vertical axis. Such a shift can then readily be compensated for by simply adjusting the bias field to a minus or plus value to in effect shift the operating point on the characteristic curve back to its maximum position illustrated in FIG. 2. There is thus provided in accord with this first feature of the invention an electro-optic means for controlling the output radiation from the frequency doubling crystal and the heretofore attendant problems of critical temperature control are lessened considerably.

In accord with a second aspect of the invention, the feedback control described in FIG. 1 may be utilized to hold automatically the output radiation at a given operating point on the characteristic curve 28 notwithstanding slight temperature variations all to the end that maximum efficiency can be realized when utilizing the electro-optical effect for modulation purposes.

Consider first the operation of the feedback system in connection with maintaining the output of the doubled frequency radiation at its maximum magnitude or at the point 29 shown in FIG. 2. As stated, a low frequency probe modulating signal $fp$ is superimposed on the biasing signal on the plates 14 and 15. Assume now that a drift in temperature or some other parameter occurs such as to shift the output from its maximum amplitude or to the right as viewed in FIG. 2. In this event, there will be detected the probe modulation in the photo tube 23 as indicated by $+fp$ and the phase or polarity of this signal will be detected by the phase detector 24. The feedback signal is properly transduced and employed to control the bias of the electric field between the plates 14 and 15 in such a manner as to shift the operating point in FIG. 2 back to the optimum point 29. When at the point 29, the detected signal from the low frequency probe modulation signal $fp$ is substantially zero since the slope of the characteristic curve at the point 29 is zero.

Should the shift occur in the opposite direction such as to the left of the point 29, the detected probe modulation signal would be as indicated at $-fp$ in FIG. 2 and because the slope of the curve to the left of center is opposite in sign to the slope of the curve to the right, the polarity of the detected signal would be opposite to that of the $+fp$ signal. The corresponding transduced signal for controlling the bias would thus be of opposite sign and would be of an amplitude to shift the operating point back to the point 29 on the output characteristic curve.

It will be evident accordingly that the feedback arrangement will automatically adjust the electric field bias to maintain the output of the doubled frequency radiation at its maximum value.

The same feedback system may be utilized, by simply adding a control DC signal to the feedback signal, to stabilize the output of the doubled frequency signal at any desired output amplitude such as a point of inflection on the characteristic curve 28. By such control, deviations of the amplitude of the second harmonic radiation output from such point of inflection will result in a feedback signal for changing the biasing electric field in a manner to return the output to its selected or given value of amplitude on the characteristic curve. In the event, for example, that the output radiation were to be modulated by the electro-optic effect with an information modulating device such as indicated at 19 in FIG. 1, maximum modulation of the output would occur when modulating about an inflection point on the curve; that is, a point wherein the slope or rate of change is maximum. By employing the feedback arrangement to maintain operation about such point, maximum percent of modulation for a given input modulating signal is realized.

It should be understood that the electro-optic effect may also be used to effect "on-off" modulation of the output signal; that is, the modulation information signal may simply constitute given signals of constant amplitude, time spaced in accord with information to be transmitted to effectively switch the amplitude from its maximum to zero value and back to its maximum value.

As mentioned heretofore, the use of lithium niobate requires only a modest electric field strength for control. For example, the field (volts per cm.) times the length 1 of the crystal is 5.4 kv. to change from maximum to zero output.

From the foregoing description, it will thus be evident that the present invention has provided a novel method and apparatus wherein all the various objects set forth are fully realized.

What is claimed is:

1. A method of providing control of light comprising the steps of: passing light radiation through a frequency doubling crystal; applying a biasing electric field to said crystal in a direction normal to the path of radiation through said crystal; adjusting the strength of said field to control the output of doubled frequency radiation from said crystal to have an amplitude of given value; superimposing on said biasing electric field a relatively low frequency probe signal to modulate said field; transducing the resulting modulation of said output of doubled frequency radiation from said crystal into a feedback signal of polarity and amplitude constituting a function of any shift in the amplitude of said output of doubled frequency radiation from its said given value; and adjusting the strength of said biasing electric field in accordance with said feedback signal to return the amplitude of said doubled frequency radiation to said given value.

2. The method of claim 1, in which said given value corresponds to the maximum amplitude of said output.

3. The method of claim 1, in which said given value corresponds to a point of inflection on the output characteristic curve of the output of doubled frequency radiation when plotted as a function of said biasing electric field, and superimposing on said biasing electric field an information signal to modulate said field and thereby modulate the amplitude of said output of doubled frequency radiation in accordance with said information signal about said point of inflection.

4. An apparatus for providing control of light comprising: a laser device for providing light radiation of a given frequency; a frequency doubling crystal positioned to receive said light radiation and provide an output of doubled frequency radiation; control means for passing an electric field through said crystal in a direction normal to the path of radiation passing through said crystal, the amplitude of said output of doubled frequency radiation being responsive to the strength of said electric field whereby modulation of said electric field modulates said amplitude of the output of doubled frequency radiation, said electric field including a biasing field adjusted to a strength to establish the amplitude of said output of doubled frequency radiation at a given value about which said modulation takes place; and a feedback control means for automatically adjusting said strength of the biasing field to return said output to said given value should said output change in response to temperature variations, said feedback control means including means for generating and superimposing on said electric field a relatively low frequency probe signal to modulate said field; and photodetecting means positioned to monitor a portion of said output of doubled frequency radiation and provide a feedback signal of polarity and amplitude constituting a function of any shifting of the amplitude of said output from said given value, said control means receiving said feedback signal and changing said biasing field in response to said signal in a manner to return the amplitude of said output to said given value.

5. An apparatus according to claim 4, in which said frequency doubling crystal comprises lithium niobate.

6. An apparatus according to claim 4, in which said given value corresponds to the maxium value of the amplitude of said output of doubled frequency radiation.

References Cited

UNITED STATES PATENTS 3,328,723   6/1967   Giordmaine et al. ____ 332—7.51
3,364,433   1/1968   Freund et al. _____ 332—7.51

ROY LAKE, Primary Examiner

D. R. HOSTETTER, Assistant Examiner

U.S. Cl. X.R.

321—69; 332—52; 350—160